United States Patent Office.

JOHN D. NUMAN, JAMES T. WILKINSON, AND ELIOTT W. COOK, OF LOCKPORT, NEW YORK, ASSIGNORS TO JOHN D. NUMAN, JAMES T. WILKINSON, JAMES T. WILKINSON, JR., N. B. CHASE, AND J. L. ASHBY.

Letters Patent No. 68,106, dated August 27, 1867.

IMPROVED CEMENT FOR ROOFING.

The Schedule referred to in these Letters Patent and making part of the same.

TO ALL WHOM IT MAY CONCERN:

Be it known that we, JOHN D. NUMAN, JAMES T. WILKINSON, and ELIOTT W. COOK, of the city of Lockport, county of Niagara, and State of New York, have invented a new and improved Water-Proof Cement for Roofing Buildings, or for any other purposes where the same may be used to guard against water or weather; and we do hereby declare that the following is a full and exact description thereof; and to enable others skilled in the arts to make and use our cement and invention, we will proceed to describe its construction and operation.

In general, we compose our cement of ground anthracite coal, ground gypsum, and ground tan-bark, in about the proportions of two parts each of the coal and gypsum to one part of the tan-bark, mixed to the consistency of thin mortar with prepared coal tar. The tar is prepared by melting and combining with it India rubber, so that the same forms a new composition of India rubber and coal tar. For this purpose we usually use old cast-off rubber, a sufficient quantity of which almost every family in the United States possesses to roof their building, when compounded with the tar, at a trifling and nominal expense, from what is usually thrown away and wasted. The rubber and tar being melted together, the union of their substances is so perfect that they form a unit in almost any proportion, thus forming a liquid basis of the best and most perfect protective quality, against water or weather, which, owing to its elasticity and imperviousness to water, is not affected by heat of the sun, or frost. Owing to the porous nature of the substances of which we compose our cement it dries more readily than other tar cements, and does not separate from, but holds the rubber and tar in the composition, so that the same is not driven through or drawn to the top or surface by the heat of the sun, and may be applied to a perpendicular surface without running. We claim for this cement a new and original compound, the result of careful study and experiments.

What we claim as our invention, and desire to secure by Letters Patent, is—

The aforesaid cement, composed of the aforesaid compound or any other, substantially the same, and which will produce the intended effect.

JOHN D. NUMAN,
JAMES T. WILKINSON,
ELIOTT W. COOK.

Witnesses:
JAMES T. WILKINSON, Jr.,
H. J. GRAHAM.